UNITED STATES PATENT OFFICE.

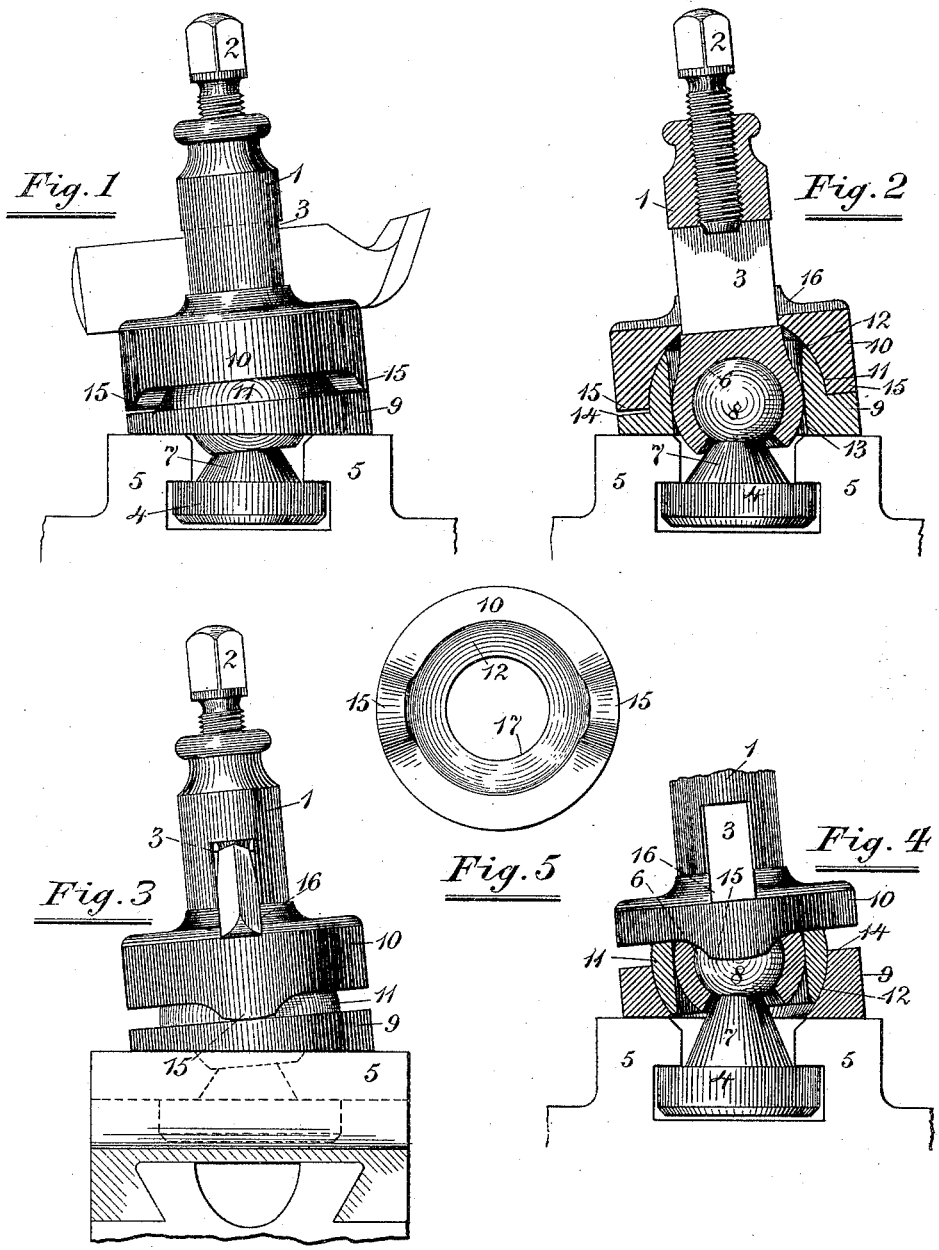

ANSON G. RONAN, OF TORONTO, CANADA.

TOOL-POST.

SPECIFICATION forming part of Letters Patent No. 467,437, dated January 19, 1892.

Application filed February 12, 1891. Serial No. 381,251. (No model.)

*To all whom it may concern:*

Be it known that I, ANSON GROVES RONAN, a subject of the Queen of Great Britain, residing at the city of Toronto, in the county of York and Province of Ontario, Canada, have invented certain new and useful Improvements in Tool-Posts, of which the following is a specification.

My invention relates to an improved tool-post for lathes, planers, shapers, and all such machinery as require a tool to be securely held to cut the metals and other substances worked by such machinery; and the objects of my invention are, first, to provide a tool post or holder whereby a tool can be held secured at any angle within a reasonable limit of inclination to the work, thereby enlarging the range of work possible to be performed by a single tool, both as regards the different sides and other cuts in the same metal and the proper inclination or rake peculiar to the different metals; second, to provide a tool-post whereby the same tool can be used to cut both left and right hand threads of the same or different and various pitches, and, third, to provide a tool-post affording a more ready adjustment of the tool than the ordinary posts in use heretofore. I attain these objects by means of the device illustrated in the accompanying drawings, in which similar numbers of reference refer to similar parts throughout.

Figure 1 represents a side elevation of my improved tool-post at the position giving the tool secured therein the greatest rake. Fig. 2 represents the vertical section at the central axis of the post in the same position as the foregoing figure, but having the tool removed. Fig. 3 represents the front elevation of the post adjusted to cut a left-hand thread where only a medium height of the point of the tool is necessary or less rake desirable. Fig. 4 represents a partial vertical section at center line of an alternative arrangement of the bed and bolster rings inverted from that shown in Fig. 2, and Fig. 5 represents the bolster-ring inverted to more fully illustrate its shape.

The tool-post 1 resembles ordinary posts in the respects of having a similar set or clamping screw 2, tool-mortise 3, and footing 4, by which latter it is maintained in position in the jaws 5 of the slide-rest of a lathe or corresponding device for the same purpose in other machines, the essential difference in my improved post being that it is composed of two parts jointed together by means of a universal or ball-socket joint 6 therein, and from the center of which joint 6 the upper portion of the said post 1 can be inclined at an angle to the lower portion in any direction to an extent to meet the requirements usually desirable or necessary. The post 1, as already observed, is made in two distinct parts, the upper portion having an enlargement at its lower extremity, in which the socket is formed in the shape of a cylindrical hole terminating in a dome or hemispherical shape. The lower or footing portion 4 is formed with a head to engage the jaws 5 of the slide-rest, similarly as other tool-posts heretofore in use; but the shank portion 7 has a ball 8 formed on the end of it of a diameter to fit neatly into the socket formed in the upper portion of the post next hereinbefore described.

For the rigid support of the cutting-tool concave and convex rings are employed, and consist of the bed-ring 9 and the bolster-ring 10, either of which may have a hemispherical or half-ball-shaped projection 11 on it, and the other ring a corresponding hemispherical cavity 12 to receive and closely fit the said half-ball 11. The bed-ring 9 has an axial opening 13 to admit the tool-post 1 therein and allow it to incline in any direction. The centers of the bed and bolster rings 9 and 10 are essentially as closely as practicable the same as that of the ball-socket joint 6 in the tool-post 1.

Preferably the bed-ring 9 is formed considerably thicker at one side than diametrically opposite by having, preferably, its lower side cut oblique to the axis of formation heretofore. The flange 14 is provided for the purpose of forming a rigid and positive support for the bolster-ring 10 to rest on below the cutting-tool. The bolster-ring 10 is about the same diameter as the said bed-ring 9 and has an axial opening 17 through it to admit the tool-post 1 therein freely, and when the convex projection 11 is formed on the bed-ring 9 the said bolster-ring 10 has the corresponding cavity 12 formed in its under side.

The reason of the above condition is that I can form the cavity 12 in the bed-ring 9, as in Fig. 4, which exhibits this alternative. Farther than the reversed condition of the rings 9 and 10 in Fig. 4 I form the rests or calks 15 (shown in Figs. 1, 2, and 4 as on the bolster-ring 10 and resting on the flange 14) on the bed-ring 9 instead, which possesses the advantage of not forming a rest for dirt, chips, and other objectionable substances to get into the joint when the said cavity 12 exists in the bed-ring 9.

The calks 15 are for the purpose of forming a rigid support and a positive security where a liability exists for the rings 9 and 10 to frictional slip on one another under the pressure exerted by a heavy cut on the tool.

In the alternative forms for the top of the bolster-ring 10 (shown by Fig. 4 and the three preceding figures) I form a tool-channel 16 for the purpose of causing the said bolster-ring 10 to turn with the tool, so as to maintain one of the calks 15 always beneath the tool to receive the pressure and rest on the flange 14. The said calks 15 are not an essential necessity, for I may dispense with them entirely, as the grip of the frictional contact between the said rings 9 and 10 is sufficient, I find, under all ordinary circumstances to maintain the post 1 and tool in position without slipping, and in posts for small machines they can be dispensed with. When the calks 15 are employed, it is preferable to form them so that both cannot rest on the flange 14 at once, but that a small space exists beneath the one at the rear side from the work when the tool has been properly set.

In using my improved tool-post the amount of rake and height of the tool-point can be regulated and adjusted by turning the rings 9 and 10 on one another in different relation, as shown by Figs. 1 and 3, the latter bringing the tool horizontal; also, by turning one of the rings a half-circle and keeping the other fixed, from the position shown in Fig. 1, the point of the tool can be depressed to the lowest level and give least rake, or by reversing the tool through the post and turning all bodily round a half-circle will give the same result.

I anticipate that a tool-post having a joint—such as two engaged rings or links like a chain—can be inclined in any direction similarly to the ball-socket joint I employ; but the link-joint has the disadvantage of only a point or limited area of contact, and consequent increased wear.

Therefore what I claim as my invention, and desire to secure by Letters Patent, is—

1. In a tool-post or tool-holder, the foot portion composed of a shank having a ball formed on one end to fit within the lower extremity of the upper portion of the post and a head on the opposite end as a means by which the post is secured, substantially as shown and described.

2. In a tool-post or tool-holder, the bed-ring encircling the post and having its lower plane oblique to the circumference and its upper plane marginal around an inner circular-curved surface forming a bearing to support the bolster-ring thereon, said upper plane being at right angles to said circumference, substantially as shown and described.

3. In a tool-post or tool-holder, the bolster-ring encircling the post and supported on the bed-ring and having an inner circular-curved surface to fit an adapted curved surface on said bed-ring, substantially as shown and described.

4. In combination, the tool-post having a joint therein as a means whereby it can be inclined, a bed-ring encircling said post and having its upper and lower plane surfaces oblique to one another, and a bearing formed on its upper side to fit the bolster-ring supported thereon, substantially as shown and described.

5. In combination, the tool-post having a joint therein as a means whereby it can be inclined, a bed-ring encircling said tool-post and having the form hereinbefore specified, and a bolster-ring encircling said post and having a bearing formed on its lower side to fit over the bed-ring, substantially as shown and described.

6. In combination, the tool-post or tool-holder having a joint therein for the purpose specified, a bed-ring encircling said post and having the form hereinbefore set forth, a bolster-ring also encircling said post and having the tool-channel formed in the top thereof, and the calks formed on the lower side of the bolster-ring, substantially as shown and described.

A. G. RONAN.

Witnesses:
G. I. ASHWORTH,
ALEX. D. CARTWRIGHT.